(12) United States Patent
Shavell

(10) Patent No.: US 10,404,733 B1
(45) Date of Patent: Sep. 3, 2019

(54) ACTIVE PUSH-BASED REMEDIATION FOR REPUTATION-BASED SECURITY SYSTEMS

(71) Applicant: Symantec Corporation, Mountain View, CA (US)

(72) Inventor: Michael Shavell, Merrimack, NH (US)

(73) Assignee: Symantec Corporation, Mountain View, CA (US)

( * ) Notice: Subject to any disclaimer, the term of this patent is extended or adjusted under 35 U.S.C. 154(b) by 198 days.

(21) Appl. No.: 15/013,893

(22) Filed: Feb. 2, 2016

(51) Int. Cl.
*H04L 29/00* (2006.01)
*H04L 29/06* (2006.01)

(52) U.S. Cl.
CPC .................. *H04L 63/1433* (2013.01)

(58) Field of Classification Search
CPC .................................................. H04L 63/1433
USPC ............................................................ 726/25
See application file for complete search history.

(56) References Cited

U.S. PATENT DOCUMENTS

| 8,020,206 | B2 * | 9/2011 | Hubbard | G06F 17/30864 726/22 |
| 2005/0018618 | A1 * | 1/2005 | Mualem | H04L 63/1458 370/252 |

* cited by examiner

*Primary Examiner* — Anthony D Brown
*Assistant Examiner* — Michael D Anderson
(74) *Attorney, Agent, or Firm* — Patterson + Sheridan, LLP

(57) ABSTRACT

The present disclosure relates to initiating remediation of security risks on an endpoint system based on updated reputation data. According to one embodiment, a reputation service receives a request, from a first endpoint system, for reputation data about an object. A reputation service transmits, in response to the request, data indicating a current reputation of the object. The reputation service determines that the object presents a security risk and updates reputation data associated with the object to indicate that the object presents a security risk. Upon updating the reputation data, the reputation system transmits, to the first endpoint system, updated reputation data associated with the object and instructions to remedy the security risk.

15 Claims, 5 Drawing Sheets

ACTIVE PUSH-BASED REMEDIATION FOR REPUTATION-BASED SECURITY SYSTEMS

BACKGROUND

Field

Embodiments presented herein generally relate to computer security systems, and more specifically, to techniques for performing security remediation on a computing system in response to updates from a reputation service.

Description of the Related Art

Computer security systems are generally designed to protect computer software and hardware from threats arising from malware, such as viruses, Trojan horses, and so on. These threats may arise, for example, from users visiting compromised websites, opening e-mail attachments with malicious payloads, or installing compromised software and so on. To protect users from such threats, security software can analyze a file and determine if the file presents a security threat (e.g., includes a malicious payload). If the file presents a security threat, the security software generally blocks the user device from executing any payload associated with the file by, for example, blocking processes running on a computing system from opening a file, blocking execution of a program, and so on.

In some cases, security software can use reputation data related to known files (or payloads) in addition to (or in lieu of) file scanning or other malware detection techniques. When a user attempts to open a file or launch an executable, the security software can generate a fingerprint of the file or executable and query a remote reputation service for reputation data about the file or executable based on the fingerprint. If the reputation service indicates that the file is safe (i.e., does not include a malicious payload), the security software can allow the computing system to proceed with opening the file or launching the executable. If the reputation service, however, indicates that the file is unsafe (i.e., includes a malicious payload), the security software can block the computing system from opening the file or launching the executable, which may prevent the computing system from executing the malicious payload.

As the threat environment evolves with new programs and unknown threats, the reputation service may indicate to security software that no reputation data exists for a requested file or executable. The decision to allow or block execution of a file may be left to the discretion of the security system until the reputation service determines if the file is safe or unsafe.

SUMMARY

One embodiment of the present disclosure includes a method for initiating remediation of security risks on an endpoint system based on updated reputation data. The method generally includes receiving a request, from a first endpoint system, for reputation data about an object. A reputation service transmits, in response to the request, data indicating a current reputation of the object. The reputation service determines that the object presents a security risk and updates reputation data associated with the object to indicate that the object presents a security risk. Upon updating the reputation data, the reputation system transmits, to the first endpoint system, updated reputation data associated with the object and instructions to remedy the security risk.

Another embodiment provides a computer-readable storage medium having instructions, which, when executed on a processor, performs an operation for initiating remediation of security risks on an endpoint system based on updated reputation data. The operation generally includes receiving a request, from a first endpoint system, for reputation data about an object. A reputation service transmits, in response to the request, data indicating a current reputation of the object. The reputation service determines that the object presents a security risk and updates reputation data associated with the object to indicate that the object presents a security risk. Upon updating the reputation data, the reputation system transmits, to the first endpoint system, updated reputation data associated with the object and instructions to remedy the security risk.

Still another embodiment of the present invention includes a processor and a memory storing a program, which, when executed on the processor, performs an operation for detecting security risks from application packages signed using a key. The operation generally includes initiating remediation of security risks on an endpoint system based on updated reputation data. The method generally includes receiving a request, from a first endpoint system, for reputation data about an object. A reputation service transmits, in response to the request, data indicating a current reputation of the object. The reputation service determines that the object presents a security risk and updates reputation data associated with the object to indicate that the object presents a security risk. Upon updating the reputation data, the reputation system transmits, to the first endpoint system, updated reputation data associated with the object and instructions to remedy the security risk.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments presented herein provide techniques for alerting a given user device to updated reputation information for files or other information previously provided to a reputation service. A reputation service can actively alert a given user device to newly available reputation information for a previously unknown object (e.g., a file). A user device can use the alert and the newly available reputation information (e.g., that a previously unknown file includes a malicious payload, that a previously unknown network address is part of a botnet, and so on) as a trigger for initiating remediation processes at the user device. The remediation processes may, for example, restore a user device to a previous state before a given file was opened or executed block future traffic to and from a specified network address, and so on.

Advantageously, by alerting user devices to updated reputation information, a reputation service can perform post facto remediation of security threats that have arisen within an evolving threat landscape. Security software executing on a user device need not wait until the next time a user opens a previously unknown file, launches a previously unknown executable, or communicates with a previously unknown location on a network. Rather, security software can use information received from a reputation service to determine whether the security software should attempt to reverse actions previously taken with respect to, or clean up any harm resulting from, a particular file, executable, network destination, and so on. For example, if updated reputation data indicates that a file, executable, network destination, etc. is good or trusted, the security software need not take any further action. However, if the updated reputation data indicates that a file, executable, network destination, etc. is untrusted, the security software may determine an appropriate course of action to remedy the security vulnerability.

Figure 1:
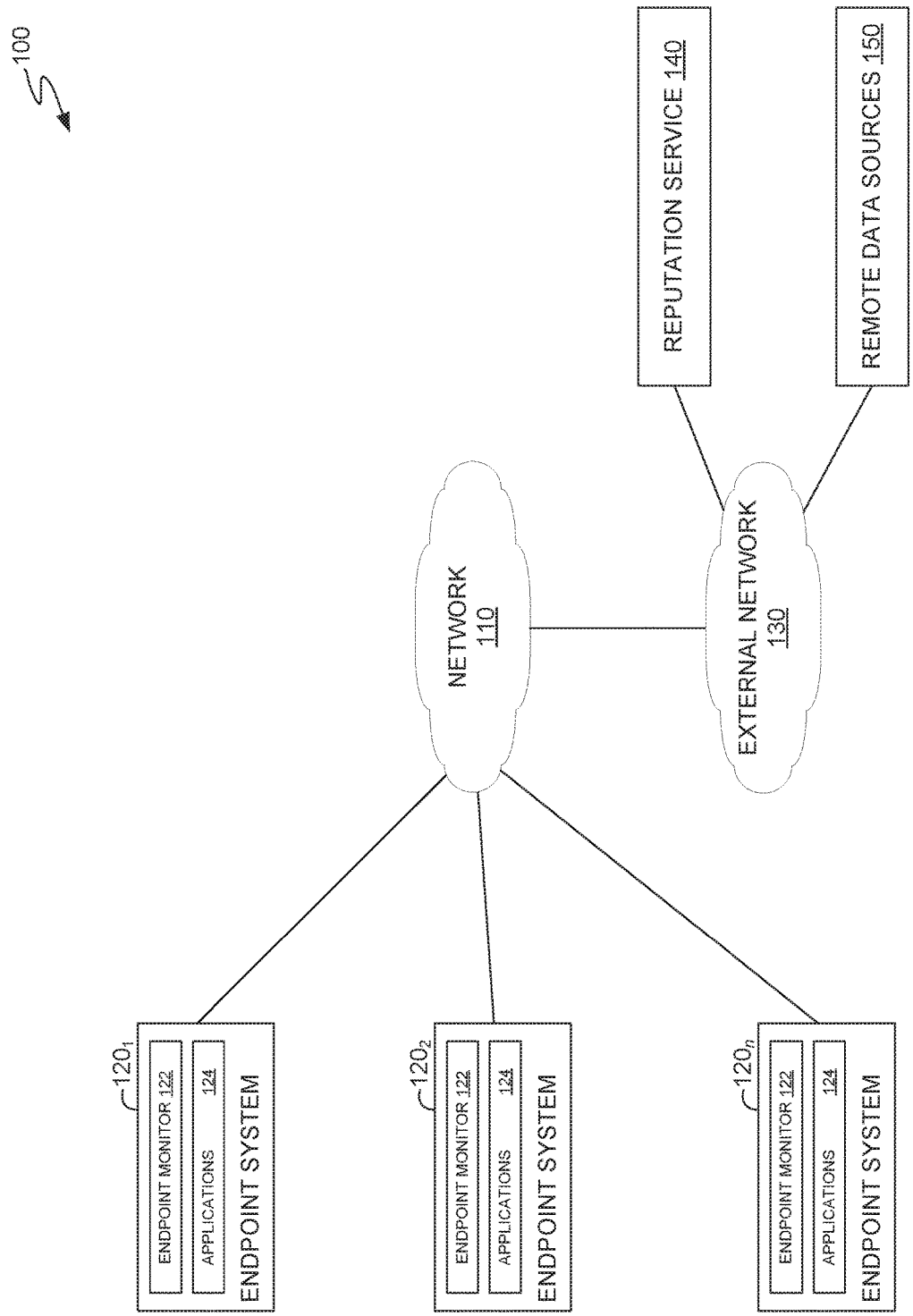
FIG. 1 illustrates an example of a networked computing environment, according to one embodiment.

FIG. 1 illustrates an example computing environment 100, according to one embodiment. As shown, the computing environment generally includes a plurality of endpoint systems 120 connected to a network 110. Network 110 may be connected to one or more external networks 130, and each of the endpoint systems may access a remote reputation service 140 and one or more remote data sources 150 through network 110 via the one or more external networks 130.

Each endpoint system 120 in network 110 may execute an endpoint security system locally to monitor for potential security breach events, such as rogue downloads, execution of rogue applications, exfiltration of data stored on an endpoint system 120, and so on. As illustrated, endpoint systems generally include an endpoint monitor 122 and one or more applications 124.

In some cases, endpoint monitor 122 generally includes an interface for querying reputation service 140 for reputation data related to files downloaded from a remote data source 150, network traffic to a remote data source 150, and so on. For example, if an application 124 attempts to download a program installation package from a remote data source 150, endpoint monitor 122 may query reputation service 140 for information about the remote data source 150 (e.g., by providing an address of the remote data source 150 to reputation service 140. If data returned from reputation service 140 indicates that the remote data source 150 has a good reputation (e.g., is trusted), endpoint monitor 122 may allow the application 124 to download the program installation package from the remote data source 150. If, however, data returned from reputation service 140 indicates that the remote data source 150 has a poor reputation (e.g., is not trusted), endpoint monitor 122 may block application 124 from downloading the program installation package. If data returned from reputation service 140 indicates that the remote data source 150 has an unknown reputation, endpoint monitor 122 can allow or block access to the remote data source 150 based on a local policy or a response to an alert displayed to a user by endpoint monitor 122.

In another example, endpoint monitor 122 can query reputation service 140 for information about an application or program installation package that a user attempts to execute on an endpoint system 122. The query may include, for example, information uniquely identifying the file (e.g., an MD5 hash). In response, endpoint monitor generally receives reputation data related to the application or program installation package that indicates if the application or program installation package is trusted, untrusted, or unknown. If the application is trusted (e.g., commercial software packages signed by a known software developer, widely used and trusted open source software packages, and so on), endpoint monitor 122 may allow the application or program installation package to run on endpoint system 120. If, however, the application is untrusted (e.g., includes malware, keyloggers, or other malicious payloads), endpoint monitor 122 can block the application or program installation package from launching and may additionally delete the application or program installation package.

Endpoint monitor 122 may apply similar techniques to request reputation data for other sources, such as mobile application repositories, spam detection, and so on. For example, endpoint monitor 122 may request reputation data for both a mobile application repository and a requested application that a user has requested from the mobile application repository. For spam detection, endpoint monitor 122 can request reputation data for the source of an e-mail message (e.g., an internet protocol address in an e-mail header identifying the source of the e-mail message), as well as reputation data for any attachments included in the e-mail.

In some cases, after endpoint monitor 122 receives information indicating that a file or network destination has an unknown reputation, endpoint monitor 122 may subsequently receive data indicating that reputation service 140 has determined the actual reputation of the file or network destination. If, for example, the actual reputation of the file or network destination is good, endpoint monitor 122 need not take any further action with respect to the file or network destination. If, however, the actual reputation of the file or network destination is poor (e.g., the file actually includes a malicious payload or the network destination is compromised), endpoint monitor 122 may take one or more actions to reverse previous actions taken with respect to the file or network destination. For example, if an unknown (but actually malicious) application package was installed on endpoint system 120, endpoint monitor 122 may uninstall the application package and attempt to reverse any changes the application made to endpoint system 120 (e.g., additional software downloaded by the application, changes to the system environment initiated by the application, and so on).

In some cases, endpoint monitor 122 may receive specific remediation instructions along with information indicating that the reputation of a previously unknown file or network destination is poor (or untrusted). Upon receiving these remediation instructions, endpoint monitor 122 may perform the specified actions to remedy security threats that may have resulted from executing the previously unknown file or communicating with the previously unknown network destination.

Reputation service 140 generally may be an existing service that uses crowdsourced data to determine whether applications and network destinations are trusted, untrusted, or unknown. In some cases, reputation service 140 may be hosted in the cloud and accessible by endpoint monitor 122 via an external network 130 (e.g., the Internet). As new applications and threats are introduced into various computing environments, reputation service 140 may be updated to reflect the reputation of the new applications. For example, when a new version of an office productivity suite is released, reputation service 140 may be updated to reflect that the new version of the office productivity suite is trusted (like previous versions of the suite). Other applications may initially have an unproven or unknown reputation, and as reputation service 140 receives additional data about the application from other users, reputation service 140 may update the reputation to reflect user feedback about the application.

Reputation service 140 generally receives data from client devices to aid in identifying the reputation of files, network destinations, and so on. For example, if an endpoint monitor 122 prompts a user to allow or block an application from executing on endpoint system 120, endpoint monitor 122 may transmit data to reputation service 140 with information about the user's selection. If a user allows the application in question to run on endpoint system 120, reputation service 140 may determine that the user has given the application a "trusted" or "good" reputation. Likewise, if a user blocks the application in question from running on endpoint system 120, reputation service 140 may determine that the user has given the application an "untrusted" or "poor" reputation.

Reputation service 140 may, in some cases, additionally receive telemetry data from endpoint monitor 122 that identify, for example, the level of network activity generated by an application and the destination of the network activity. Additionally, reputation service 140 may gather other telemetry data, such as web traffic data obtained from network operators. Based on the obtained telemetry data, reputation service 140 may determine that the application has a good reputation, for example, if the application is communicating with trusted network destinations. Likewise, reputation service 140 may determine that the application has a poor reputation if, for example, the application is communicating with untrusted network destinations or attempts to exfiltrate certain types of data (e.g., passwords) from an endpoint system 120.

In some cases, an endpoint system 120 may include a management console that allows a system administrator to manage reputation service 140. For example, reputation service 140 may provide a list of files and network destinations with an unknown reputation to the management console. System administrators can adjust the reputation of each file and network destination with an unknown status based, for example, on manual, offline analysis (e.g., of source code or decompiled object code).

As reputation service 140 receives requests for reputation data from an endpoint system 120, reputation service 140 can generate a log entry identifying the endpoint system 120 and the subject of the reputation data request (e.g., a file, network destination, etc.). Reputation service 140 may assign an expiration or deletion date to each log entry and periodically delete log entries from the request log to remove older entries. In some cases, reputation service 140 may discard log entries if the subject of the reputation data request has a known reputation.

When reputation service 140 changes the reputation of a previously unknown file or network destination to "good" or "trusted," reputation service 140 may delete entries in the log that include the previously unknown file or network destination as the subject of a reputation data request. If, however, reputation service 140 changes the reputation of a file or network destination to "poor" or "untrusted," reputation service 140 may query the log to obtain a list of endpoint systems 120 that requested reputation data for the previously unknown file or network destination. Reputation service 140 may subsequently notify the endpoint monitor 122 on each of the endpoint systems 120 that reputation data for the previously unknown file or network destination has changed (i.e., that the previously unknown file or network destination is now untrusted).

In some cases, when reputation data for a previously unknown file or network destination changes to "poor" or "untrusted," reputation service 140 may additionally determine the actions that an endpoint system 120 should perform to remedy any potential security risks from the previously unknown file or network destination. For example, reputation service 140 may determine that an endpoint system should uninstall an application associated with an application installation package. In another example, reputation service 140 may determine that an endpoint system 120 should block network communications between the endpoint system and a network destination (e.g., a botnet command and control server). In another example where endpoint system 120 monitors for spam messages in an e-mail system, reputation service 140 may determine that the endpoint system 120 should delete messages sent from a particular source.

When reputation service 140 determines remediation actions that an endpoint system is to perform, reputation service 140 may transmit, along with the updated reputation data for a file or network destination, information identifying the determined remediation actions. By transmitting information about the determined remediation actions to an endpoint monitor 122, reputation service 140 can actively trigger remediation of previous actions (e.g., allowing a user to launch an executable file on an endpoint system 120, allowing a user to access a particular domain, and so on) when reputation data changes.

Figure 2:
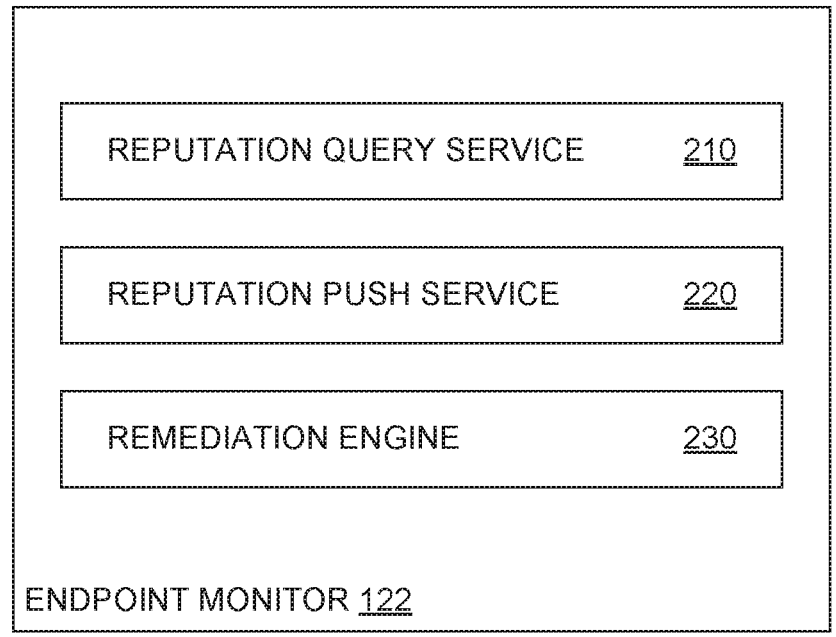
FIG. 2 illustrates an example endpoint monitor, according to one embodiment.

FIG. 2 illustrates an example endpoint monitor 122, according to one embodiment. As illustrated, endpoint monitor 122 includes a reputation query service 210, reputation push service 220, and remediation engine 230.

While endpoint monitor 122 is active, endpoint monitor 122 generally monitors activity on endpoint system 120 for potential security events, such as when a user launches a new executable, opens a file, or communicates with a remote system. When endpoint monitor 122 detects such activity on an endpoint system 120, reputation query service 210 obtains a signature of the activity to generate a query. The signature may change based on the type of activity detected by endpoint monitor 122. For example, if endpoint monitor 122 detects that a user is attempting to install a program from a downloaded installation package, reputation query service 210 may generate a signature based on a hash of the downloaded installation package (e.g., an MD5 hash of the installation package). In another case, if endpoint monitor 122 detects that endpoint system 120 has opened a connection to a network destination, reputation query service 210 can generate a signature based on the address of the network destination. Reputation query service 210 can additionally include, for example, information about other files that an application has attempted to access and/or send to a network destination.

After reputation query service 210 generates a query, reputation query service transmits the generated query to reputation service 140. In response, reputation query service 210 receives data from reputation service 140 indicating that the subject identified in the reputation data query has a "good" or "trusted" reputation, a "poor" or "untrusted" reputation, or an unknown reputation. If, as discussed above, reputation query service 210 receives data indicating that the subject identified in the reputation data query has a "good" or "trusted" reputation, endpoint monitor 122 need not take any further action.

If, however, reputation query service 210 receives data indicating that the subject identified in the reputation data query has a "poor" or "untrusted" reputation or is unknown, reputation query service 210 may perform additional processing on the subject of the query. For example, if reputation query service 210 receives data indicating that the subject of the reputation data query has a "poor" or "untrusted" reputation; reputation query service 210 may block endpoint system 120 from launching or installing a program, communicating with a network destination, and so on.

If reputation query service 210 receives data indicating that the subject of the reputation data query has an unknown reputation, reputation query service 210 may, for example, request that a user allow or block the program from launching or performing communications with a network destination. Based on user response to the request, endpoint monitor 122 may allow or block activity on the endpoint system. As discussed above, in some cases, endpoint monitor 122 may further indicate to a reputation service 140 information about the user's response to the request, which may indicate that a user trusts (if the user allows the activity) or does not trust (if the user blocks the activity) an application or network destination.

Reputation push service 220 generally provides an interface for asynchronously receiving data from a reputation service when reputation data changes from "good" or unknown to "poor" or "untrusted." As discussed above, reputation push service 220 may, from time to time, receive data from a reputation service indicating that reputation data for a particular file or network destination has changed to "poor" or "untrusted." In some cases, as discussed above, the data may additionally include instructions to remediate potential security risks that may arise from executing the previously unknown program or allowing a program to communicate with a previously unknown network destination. When reputation push service 220 receives the updated reputation data from the reputation service, reputation push service 220 may initiate remediation engine 230 to remedy any potential security vulnerabilities created from allowing the previously unknown program to run or allowing a program to communicate with a previously unknown network destination.

Remediation engine 230 generally is activated when endpoint monitor 122 detects that a security risk is executing or has executed on an endpoint system 120. For example, as discussed above, reputation engine 230 may begin executing on endpoint system 120 when reputation push service 220 informs the endpoint system 120 that reputation data related to a previously allowed application or program was negatively changed (e.g., went from trusted or neutral to untrusted). For files or programs that are the subject of remediation, remediation engine 230 may remove the previously file or program and any other programs that the previously unknown file or program installed during runtime. In some cases, where remediation engine 230 manages network connections to other computer systems, remediation engine 230 may block traffic from the endpoint system 120 to the previously unknown network destination.

In some cases, remediation engine 230 may additionally receive data from reputation service 140 (e.g., via reputation push service 220) containing instructions to remediate potential security threats arising from the subject file or communications with the subject network destination. In such a case, remediation engine 230 may remediate security risks arising from the subject file or communications with the subject network destination according to the received instructions.

Figure 3:
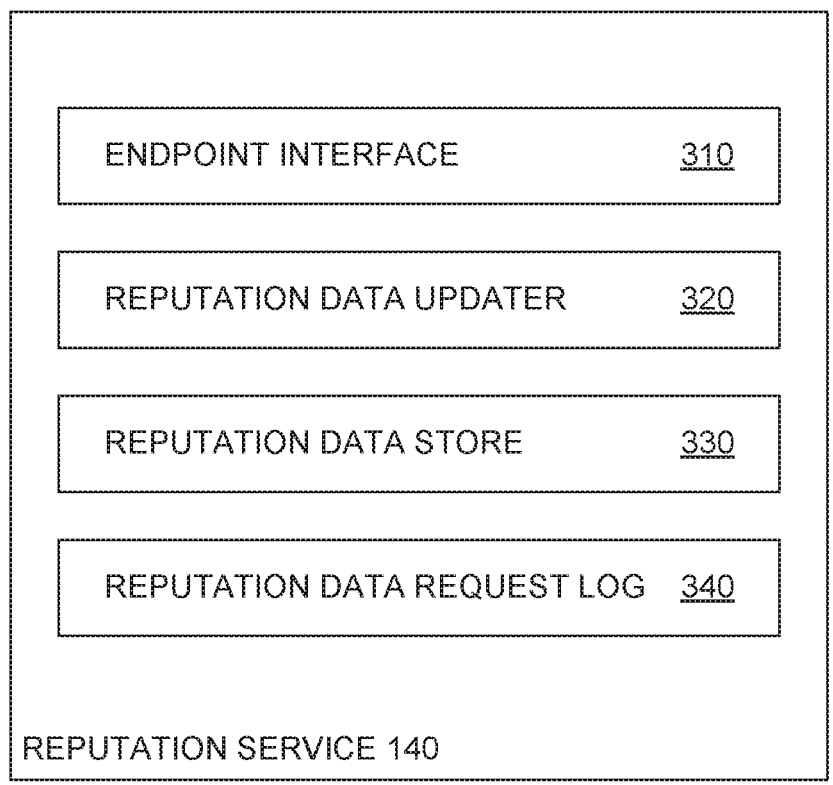
FIG. 3 illustrates an example reputation service, according to one embodiment.

FIG. 3 illustrates an example reputation service 140, according to an embodiment. As illustrated, reputation service 140 includes an endpoint interface 310, reputation data updater 320, reputation data store 330, and reputation data request log 340.

Endpoint interface 310 generally provides for bi-directional communications between reputation service 140 and endpoint systems 120 in the network. Endpoint interface 310 may receive requests for reputation data from an endpoint system 120. As discussed above, the request may include information identifying the subject of a reputation data query (e.g., a hash of a file or an internet protocol address identifying a remote data source 150) as well as data identifying the requesting endpoint system 120.

Upon receiving a request for reputation data from an endpoint system 120, endpoint interface 310 can query reputation data store 330 for the reputation of the subject file or network destination. Endpoint interface 310 additionally generates a log entry including data identifying the subject file or network destination and the requesting endpoint system 120. After endpoint interface 310 generates the log entry, endpoint interface 310 can commit the log entry to reputation data request log 340.

Endpoint interface 310 generally queries reputation data store 330 to obtain reputation data for the subject file or network destination. Upon receiving reputation data for the subject file or network destination, endpoint interface 310 may pass the reputation data for the subject file or network destination to the requesting endpoint system 120. In some cases, reputation data store 330 may not include reputation data for the subject file or network destination, and endpoint interface 310 may inform the requesting endpoint system 120 that the subject file or network destination is unknown.

Reputation data updater 320 generally obtains and aggregates data from a variety of sources about files and network destinations to generate and update the reputation status of a file or network destination. For example, as discussed above, reputation data updater 320 may receive data from endpoint devices 120 indicating that a user allowed or blocked an unknown file from executing on the endpoint device. If the user allowed the unknown file to execute, reputation data updater 320 may infer that the user trusts the unknown file. If the user blocked the unknown file from executing, however, reputation data updater 320 may infer that the user does not trust the unknown file.

In some cases, reputation data updater 320 may additionally receive telemetry data from endpoint systems 120 that indicates, for example, the network destinations that a program communicates with. Reputation data updater 320 may query reputation data store 330 for data about the network destinations identified in the telemetry data. If reputation data store 330 indicates that the identified network destinations are "trusted" or "good" (e.g., network destinations operated by commercial software providers for process offloading), reputation data updater 320 may infer or determine that the program has a good reputation. Otherwise, if reputation data store 330 indicates that the identified network destinations are "untrusted" or "poor" (e.g., botnet command and control servers), reputation data updater may infer or determine that the program has a poor reputation. Reputation data updater 320 may also receive data about other program activity, such as file access patterns and processing activity. If, for example, telemetry data indicates that a program searches for password data to send to a remote server, reputation data updater 320 may determine that the program has a "poor" reputation.

In some cases, a system administrator may manually update reputation data associated with an unknown file or network destination. Reputation data updater 320, for example, may provide a list of files and network destinations with unknown reputations to a management console located on an endpoint system 120 and prompt a system administrator to assign a reputation status (e.g., trusted or untrusted) to one or more of the files and/or network destinations. Reputation data updater 320 may write the updated reputation status to reputation data store 330.

When reputation data updater 320 writes updated reputation data for a file or network destination to reputation data store 330, reputation data updater 320 may search reputation data request log 340 for a list of endpoint systems 120 that have requested reputation data for the file or network destination. Reputation data updater 320 may pass the list of endpoint systems 120 to endpoint interface 310 and instruct endpoint interface 310 to push the updated file or network destination reputation data to each of the endpoint systems on the list. By pushing the updated reputation data to each of the endpoint systems 120 on the list, reputation data updater 320 can trigger remediation of potential security risks arising from previously unknown files or network destinations at each of the endpoint systems 120.

In some cases, reputation data updater 320 may additionally determine the actions that an endpoint system 120 should take to remedy any potential security vulnerabilities that may arise from executing the file or allowing endpoint system 120 to communicate with the network destination. For example, as discussed above, reputation data updater 320 may determine, in response to changing the reputation of a file to "poor" or "untrusted," that an endpoint system is to remove the file and a number of components (e.g., registry keys) associated with the file. In another case, reputation data updater 320 may determine that an endpoint system is to block future communications with a network destination and remove programs that, based on telemetry data, are known to communicate with the network destination. When reputation data updater 320 determines remediation procedures for a previously unknown file or network destination, reputation data updater may pass the determined remediation procedures to endpoint interface 310. Endpoint interface 310 may transmit the determined remediation procedures with the updated reputation data to each of the listed endpoint systems 120. Upon receipt of the updated reputation data and determined remediation procedures, as discussed above, an endpoint system 120 may initiate the determined remediation procedures to remedy security risks from the previously unknown file or network destination.

Reputation data store 330 may be a database that includes data associating various objects (e.g., files, network destinations, and so on) with a determined reputation. When reputation service 140 receives requests for reputation data for files or network destinations that are not included in reputation data store 330, reputation service 140 may add the file or network destination to reputation data store 330 with an unknown reputation. As discussed above, when reputation data updater 320 determines the reputation of a previously unknown file or network destination (e.g., based on user feedback, telemetry, manual input, and so on), reputation data store 330 may update the reputation of the file or network destination with the determined reputation.

Reputation data request log 340 may be a database that includes, for example, data identifying a requesting endpoint system 120, the subject of the reputation data request, and a timestamp indicating when the endpoint system 120 requested the reputation data. As discussed above, reputation data request log 340 may be configured to remove entries in the log after a preset amount of time has elapsed since the endpoint system 120 requested the reputation data. When reputation data updater 320 requests a list of stations that have requested reputation data for a particular file or network destination, reputation data request log 340 may extract the endpoint system identifiers associated with the particular file or network destination and transmit the list to reputation data updater 320, as discussed above.

Figure 4:
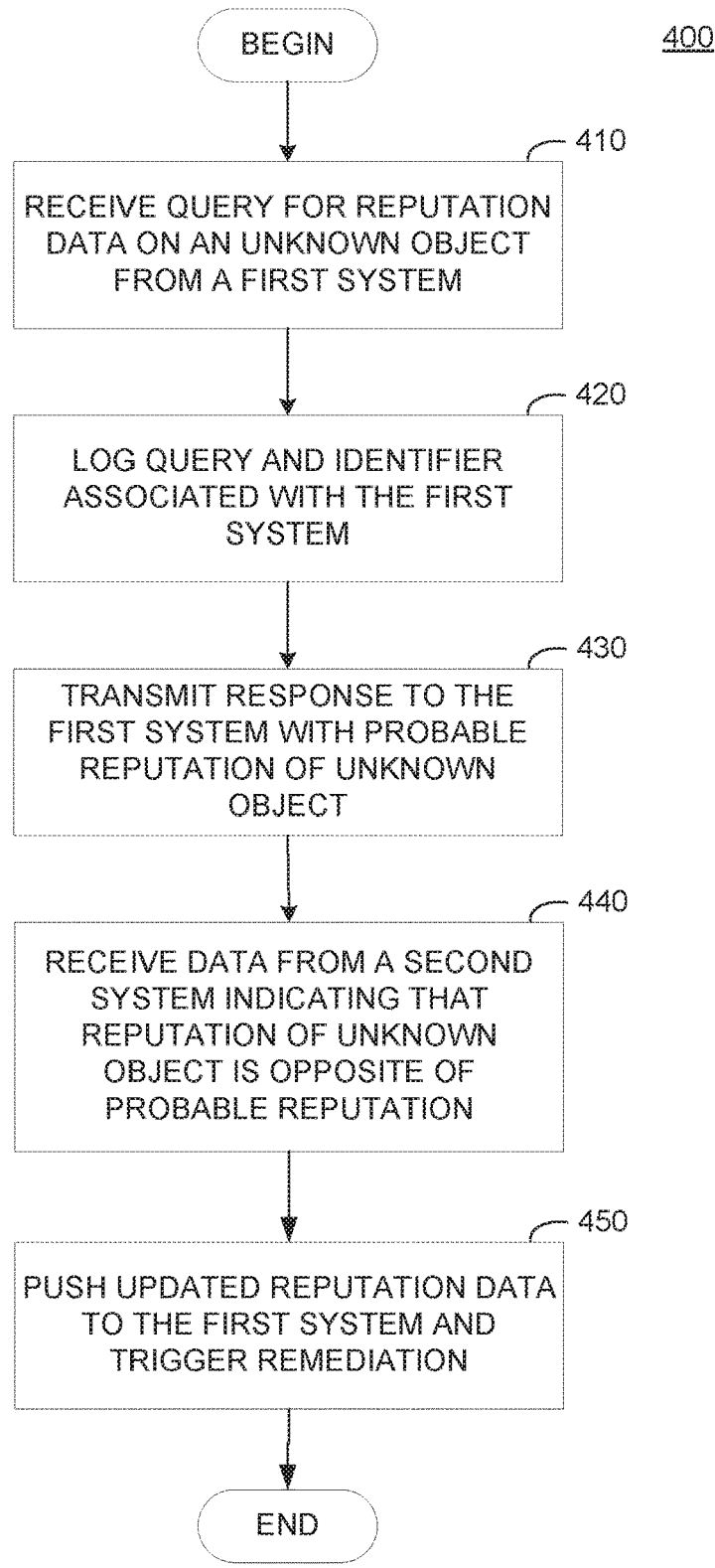
FIG. 4 illustrates example operations for pushing updated reputation information from a reputation service to an endpoint system and triggering remediation of previous actions at an endpoint system, according to one embodiment.

FIG. 4 illustrates example operations 400 that may be performed by a reputation service to push updated reputation data and remediation instructions to an endpoint system, according to one embodiment. As illustrated, operations 400 begin at step 410, where the reputation service receives a query for reputation data on an unknown object from one or more first systems. As discussed above, the query may include compressed data that uniquely identifies the unknown object, such as a hash of a file (e.g., an MD5 hash) or an IP address identifying a network destination.

At step 420, the reputation service logs the query and an identifier associated with the one or more first systems. For example, the reputation service may receive the IP address, system name, or other data (e.g., a serial number assigned to the first system by the reputation service) that uniquely identifies each of the one or more first systems.

At step 430, the reputation service transmits a response to the one or more first system with a probable reputation of an unknown object. In some cases, the reputation service may indicate to an endpoint system that the object has an unknown reputation and instruct the endpoint system to request that a user allow or block the unknown object. If the reputation service includes some data about the unknown object but has not concretely determined the reputation of the object, the reputation service may indicate the probable reputation of the file or network destination based on the available data.

At step 440, the reputation service receives data from a second system indicating that the reputation of the unknown object is opposite of the probable reputation. As discussed above, the data from the second system may include, for example, telemetry data indicating that a process spawned by the unknown object communicates with untrusted network destinations (e.g., a botnet command and control server), traffic data related to a network destination, and so on. In some cases, as discussed above, the data from the second system may include the results of manual analysis of an unknown object (e.g., a file or network destination) uploaded to the reputation service.

At step 450, upon receiving the data from the second system, the reputation service pushes the updated reputation data to the one or more first systems to trigger remediation of potential security risks presented by the object. As discussed above, the reputation service may query a log of reputation data requests to find the identities of the one or more first systems that previously requested (and received) probable reputation data for the object. The reputation service can transmit a message to each of the one or more first systems including information identifying the object, the updated reputation data, and a remediation solution related to the object. For example, as discussed above, the remediation solution may include deleting a file and executable objects associated with the file, blocking communications with a network destination, and so on.

Figure 5:
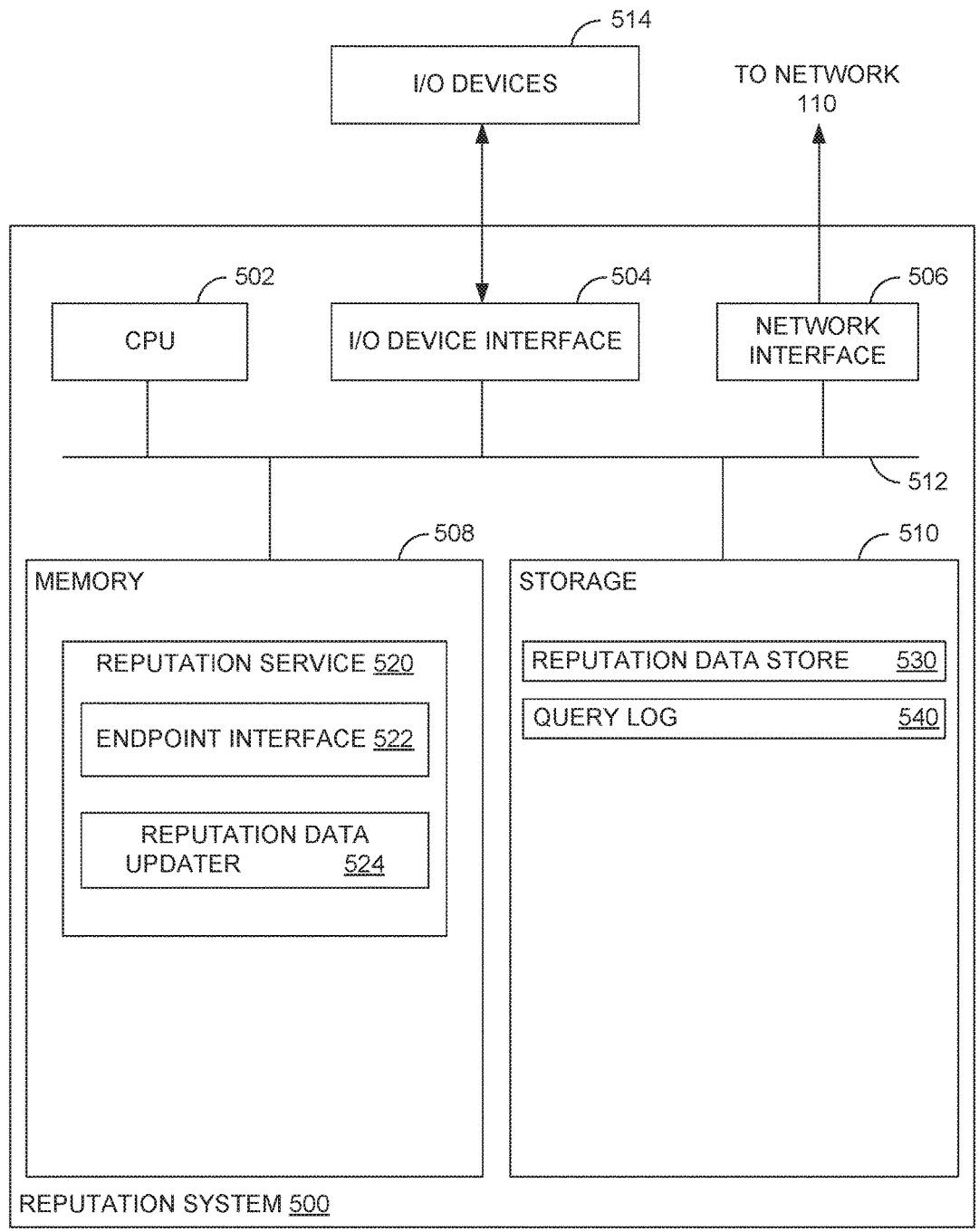
FIG. 5 illustrates an example computing system for push-based reputation data updating and remediating previous actions on an endpoint system, according to one embodiment.

FIG. 5 illustrates an example endpoint system 500 that actively alerts endpoint systems to updated reputation data for previously unknown objects and triggers security remediation procedures for the object, according to an embodiment. As shown, the endpoint system 500 includes, without limitation, a central processing unit (CPU) 502, one or more I/O device interfaces 504 which may allow for the connection of various I/O devices 514 (e.g., keyboards, displays, mouse devices, pen input, etc.) to the endpoint system 500, network interface 506, a memory 508, storage 510, and an interconnect 512.

CPU 502 may retrieve and execute programming instructions stored in the memory 508. Similarly, the CPU 502 may retrieve and store application data residing in the memory 508. The interconnect 512 transmits programming instructions and application data, among the CPU 502, I/O device interface 504, network interface 506, memory 508, and storage 510. CPU 502 is included to be representative of a single CPU, multiple CPUs, a single CPU having multiple processing cores, and the like. Additionally, the memory 505 is included to be representative of a random access memory. Furthermore, the storage 510 may be a disk drive. Although shown as a single unit, the storage 510 may be a combination of fixed and/or removable storage devices, such as fixed disc drives, removable memory cards or optical storage, network attached storage (NAS), or a storage area-network (SAN).

As shown, memory 508 includes a reputation service 520, which includes an endpoint interface 522 and reputation data updater 524. As discussed above, endpoint interface 522 generally receives, via network interface 506, requests for reputation data related to an object from one or more endpoint system. Endpoint interface 522 can search for reputation data associated with the object in storage 510 (e.g., in reputation data store 530) and transmit the actual or probable reputation of the object to the requesting endpoint system.

Reputation data updater 524 is generally configured to receive data from various endpoint systems to determine the reputation of an unknown object. As discussed above, the data may include, for example, whether users allow or block a file from executing, whether users allow or block communications with a network destination, telemetry data about applications and network destinations, and so on. When reputation data updater 524 changes the reputation of an object from "good" or "unknown" to "untrusted," reputation data updater 524 searches a query log 540 in storage 510 for identifiers of any endpoint stations that previously requested reputation data for the object. For each of the identified endpoint systems, reputation data updater 524 can send a message through endpoint interface 522 to inform the endpoint systems that reputation data for the object has changed. In some cases, as discussed above, reputation data updater 524 may additionally transmit, via endpoint interface 522, instructions for an endpoint system to remediate potential security risks arising from the previously unknown object.

As shown, storage 510 includes a reputation data store 530 and a query log 540. As discussed above, reputation data store 530 may include data identifying a universe of files, network destinations, and other objects monitored by reputation system 500. Each of the items in reputation data store 530 may be associated with a reputation value (e.g., "good" or "trusted," "unknown," or "poor" or "untrusted"). Based on data received from a number of endpoint systems, reputation data updater 524 may change the reputation value of an object in reputation data 530.

Query log 540, as discussed above, generally maintains a list of reputation data requests that reputation system 500 has received and processed. The list of reputation data requests may include an identifier of the requesting endpoint system, an identifier of the subject of the reputation request, and a timestamp. As discussed above, query log 540 may be configured to remove logged queries after an expiration time calculated from the timestamp associated with each request.

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain or store a program.

While the foregoing is directed to embodiments of the present disclosure, other and further embodiments of the disclosure may be devised without departing from the basic scope thereof, and the scope thereof is determined by the claims that follow.

What is claimed is:

1. A method for initiating remediation of security risks on an endpoint system based on updated reputation data, comprising:
   receiving a request, from a first endpoint system, for reputation data about an object;
   transmitting, to the first endpoint system in response to the request, current reputation data associated with the object;
   after transmitting the data indicating the current reputation data associated with the object in response to the request, determining that the object presents a security risk without receiving a subsequent request for reputation data about the object from the first endpoint system;
   updating reputation data associated with the object to indicate that the object presents a security risk; and
   asynchronously initiating remediation of the security risk at the first endpoint system by pushing, to the first endpoint system, the updated reputation data associated with the object and instructions to remediate the security risk at the first endpoint system, wherein the instructions to remediate the security risk comprise one or more of:
      instructions to restore the first endpoint system to a state prior to execution of the object on the first endpoint system,
      instructions to remove, from the first endpoint system, the object and one or more other objects installed by the object, or
      instructions to block, at the first endpoint system, network traffic generated by the object to one or more network destinations.

2. The method of claim 1, further comprising:
   saving the request to a log file.

3. The method of claim 2, wherein saving the request to the log file comprises saving a timestamp associated with the request and wherein an offset from the timestamp indicates a time at which the request is to be deleted from the log file.

4. The method of claim 2, wherein the pushing the updated reputation data associated with the object and the instructions to remediate the security risk comprises:
   searching the log file for requests performed by one or more second endpoint systems for reputation data related to the object; and
   for each second endpoint system that requested reputation data related to the object, pushing the updated reputation data associated with the object and instructions to initiate remediation procedures against the object.

5. The method of claim 1, wherein determining that the object presents a security risk comprises:
   receiving, from one or more endpoint systems, telemetry data about activity on the endpoint systems related to the object; and
   determining, based on the telemetry data, that the object includes a malicious payload.

6. A non-transitory computer-readable storage medium storing instructions, which, when executed on a processor, perform operations for initiating remediation of security risks on an endpoint system based on updated reputation data, the operations comprising:
   receiving a request, from a first endpoint system, for reputation data about an object;
   transmitting, to the first endpoint system in response to the request, current reputation data of the object;
   after transmitting the data indicating the current reputation data of the object in response to the request, determining that the object presents a security risk without receiving a subsequent request for reputation data about the object from the first endpoint system;
   updating reputation data associated with the object to indicate that the object presents a security risk; and
   asynchronously initiating remediation of the security risk at the first endpoint system by pushing, to the first endpoint system, the updated reputation data associated with the object and instructions to remediate the security risk at the first endpoint system, wherein the instructions to remediate the security risk comprise one or more of:
      instructions to restore the first endpoint system to a state prior to execution of the object on the first endpoint system,
      instructions to remove, from the first endpoint system, the object and one or more other objects installed by the object, or
      instructions to block, at the first endpoint system, network traffic generated by the object to one or more network destinations.

7. The computer-readable medium of claim 6, wherein the operations further comprise:
   saving the request to a log file.

8. The computer-readable medium of claim 7, wherein saving the request to the log file comprises saving a timestamp associated with the request and wherein an offset from the timestamp indicates a time at which the request is to be deleted from the log file.

9. The computer-readable medium of claim 7, wherein
   the pushing the updated reputation data associated with the object and the instructions to remediate the security risk comprises:
   searching the log file for requests performed by one or more second endpoint systems for reputation data related to the object; and
   for each second endpoint system that requested reputation data related to the object, pushing the updated reputation data associated with the object and instructions to initiate remediation procedures against the object.

10. The computer-readable medium of claim 6, wherein determining that the object presents a security risk comprises:
    receiving, from one or more endpoint systems, telemetry data about activity on the endpoint systems related to the object; and
    determining, based on the telemetry data, that the object includes a malicious payload.

11. A system comprising:
    a processor; and
    memory storing code, which, when executed on the processor, performs an operation for initiating remediation of security risks on a first endpoint system based on updated reputation data, the operation comprising:
       receiving a request, from the first endpoint system, for reputation data about an object;

transmitting, to the first endpoint system in response to the request, current reputation data associated with the object;

after transmitting the current reputation data associated with the object in response to the request, determining that the object presents a security risk without receiving a subsequent request for reputation data about the object from the first endpoint system;

updating reputation data associated with the object to indicate that the object presents a security risk; and asynchronously initiating remediation of the security risk at the first endpoint system by pushing, to the first endpoint system, the updated reputation data associated with the object and instructions to remediate the security risk at the first endpoint system, wherein the instructions to remediate the security risk comprise one or more of:

instructions to restore the first endpoint system to a state prior to execution of the object on the first endpoint system, instructions to remove, from the first endpoint system, the object and one or more other objects installed by the object, or instructions to block, at the first endpoint system, network traffic generated by the object to one or more network destinations.

12. The system of claim 11, wherein the operation further comprises:

saving the request to a log file.

13. The system of claim 12, wherein saving the request to the log file comprises saving a timestamp associated with the request and wherein an offset from the timestamp indicates a time at which the request is to be deleted from the log file.

14. The system of claim 12, wherein the pushing the updated reputation data associated with the object and the instructions to remediate the security risk comprises:

searching the log file for requests performed by one or more second endpoint systems for reputation data related to the object; and for each second endpoint system that requested reputation data related to the object, pushing the updated reputation data associated with the object and instructions to initiate remediation procedures against the object.

15. The system of claim 11, wherein determining that the object presents a security risk comprises:

receiving, from one or more endpoint systems, telemetry data about activity on the endpoint systems related to the object; and determining, based on the telemetry data, that the object includes a malicious payload.

\* \* \* \* \*